US008610893B2

(12) United States Patent
Sens et al.

(10) Patent No.: US 8,610,893 B2
(45) Date of Patent: Dec. 17, 2013

(54) MARKING AGENTS HAVING NARROW BANDS

(75) Inventors: Ruediger Sens, Ludwigshafen (DE); Thomas Gessner, Heidelberg (DE); Erwin Thiel, Siegen (DE)

(73) Assignee: BASF SE, Ludwigshafen (DE)

( * ) Notice: Subject to any disclaimer, the term of this patent is extended or adjusted under 35 U.S.C. 154(b) by 78 days.

(21) Appl. No.: 13/499,931

(22) PCT Filed: Oct. 12, 2010

(86) PCT No.: PCT/EP2010/065234

§ 371 (c)(1), (2), (4) Date: Apr. 3, 2012

(87) PCT Pub. No.: WO2011/045294

PCT Pub. Date: Apr. 21, 2011

(65) Prior Publication Data

US 2012/0194801 A1 Aug. 2, 2012

(30) Foreign Application Priority Data

Oct. 16, 2009 (EP) .................................... 09173310

(51) Int. Cl.
*G01N 21/00* (2006.01)

(52) U.S. Cl.
USPC .......................................................... 356/432

(58) Field of Classification Search
USPC ................................................. 356/432, 303
See application file for complete search history.

(56) References Cited

U.S. PATENT DOCUMENTS

| | | | | |
|---|---|---|---|---|
| 5,160,171 | A | 11/1992 | Gregory et al. | |
| 5,238,903 | A | 8/1993 | Mikoshiba et al. | |
| 6,303,213 | B1 | 10/2001 | Berneth et al. | |
| 2003/0023097 | A1* | 1/2003 | Otani et al. | 548/301.7 |
| 2006/0017957 | A1 | 1/2006 | Degott et al. | |
| 2006/0199721 | A1* | 9/2006 | Kishimoto et al. | 501/75 |
| 2011/0002530 | A1* | 1/2011 | Zhuang et al. | 382/154 |

FOREIGN PATENT DOCUMENTS

| | | |
|---|---|---|
| EP | 0 340 898 | 11/1989 |
| WO | 93 25391 | 12/1993 |
| WO | 2004 029163 | 4/2004 |
| WO | 2010 049512 | 5/2010 |

OTHER PUBLICATIONS

International Search Report Issued Feb. 1, 2011 in PCT/EP10/65234 Filed Oct. 12, 2010.

* cited by examiner

*Primary Examiner* — Roy M Punnoose

(74) *Attorney, Agent, or Firm* — Oblon, Spivak, McClelland, Maier & Neustadt, L.L.P.

(57) ABSTRACT

A process for marking articles, wherein the article to be marked is contacted with at least one marker and the absorption spectrum of the at least one marker in contact with the article has at least one narrow band with a half-height width of <1500 $cm^{-1}$ which is in the UV and/or visible and/or IR wavelength region of the electromagnetic spectrum. The markers are selected from organic dyes, inorganic chromophores and pigments. The article to be marked comprises paper, metal, glass, ceramic or plastic. Additionally a process for detecting markings on articles, comprising marking of the article, irradiation of the article with electromagnetic radiation comprising a wavelength range which at least partly overlaps with the at least one narrow band of the at least one marker, optionally performing a change in the position of the at least one narrow band and determining the absorption of the article comprising a wavelength range which at least partly overlaps with the at least one narrow band of the at least one marker.

20 Claims, No Drawings

MARKING AGENTS HAVING NARROW BANDS

The present invention relates to processes for marking articles and to articles which have been marked by these processes. The present invention further relates to processes for detecting markings on articles. The invention further provides processes for authenticating articles.

Further embodiments of the present invention can be inferred from the claims, the description and the examples. It is self-evident that the features of the inventive subject matter which have been specified above and are still to be explained below are useable not only in the combination specified in each case but also in other combinations without leaving the scope of the invention. Preferred and very preferred embodiments of the present invention are those in which all features have the preferred and very preferred definitions.

U.S. Pat. No. 6,303,213 B1 describes substrates protected against unauthorized copying by the application of visible information. The visible information is applied with the aid of dyes or pigments which, in the reflectance spectrum for the longest-wave band, have a half-height width of less than 150 nm, preferably less than 100 nm. For soluble fluorescent dyes, the absorption value in solution can be used for the half-height width.

U.S. Pat. No. 5,238,903 describes azomethine dyes for thermal printing with a half-height width of the absorption maximum of 60 to 80 nm in ethyl acetate solution (example 1). The absorption maxima of the dyes are between 430 and 620 nm.

EP 0 340 898 A2 describes a process for marking an article. The security marking is achieved with the aid of an identification marking comprising colorless or pale-colored dyes which absorb in the IR. IR dyes mentioned include nitroso, cyanine, iminium, diiminium, dithiolene compounds, phthalocyanines or azo compounds.

WO 2004/029163 A1 describes printing inks for marking and authentication of articles. In this case, the dyes or pigments of WO 2004/029163 A1 are selected such that the perception of the color space of the selected dyes with the aid of the human eye is incomplete. The printing inks described in WO 2004/029163 A1 comprise at least one dye or pigment with at least one absorption maximum in the visible region of the electromagnetic spectrum, said maximum being significantly different from the absorption maxima of the base colors of the CIEXYZ system and/or having an absorption band in the visible region of the electromagnetic spectrum with a half-height width of more preferably less than 1500 $cm^{-1}$. Dyes and pigments are selected from the compound classes of the cyanines, quinones, porphyrins, phthalocyanines and the heterosubstituted polycyclic hydrocarbons.

In spite of the approaches already described to the marking and authentication of articles there is a need for further processes, especially those processes which are easy to use and give a higher degree of security against forgeries.

It was thus an object of the present invention to provide such processes, which are easy to use with relatively high antiforgery security.

This object was achieved by processes for marking articles, which comprises contacting the articles to be marked with at least one marker, the absorption spectrum of the at least one marker in contact with the article having at least one narrow band with a half-height width of <1500 $cm^{-1}$ and the at least one narrow band being in the UV and/or visible and/or IR wavelength region of the electromagnetic spectrum.

Expressions of the $C_a$-$C_b$ form denote, in the context of this invention, chemical compounds or substituents with a particular number of carbon atoms. The number of carbon atoms can be selected from the entire range from a to b, including a and b, a being at least 1 and b always being greater than a. The chemical compounds or the substituents are further specified by expressions of the $C_a$-$C_b$-V form. V here represents a class of chemical compounds or substituents, for example alkyl compounds or alkyl substituents.

Halogen represents fluorine, chlorine, bromine or iodine, preferably fluorine, chlorine or bromine, more preferably fluorine or chlorine.

The individual collective names specified for the different substituents are each defined as follows:

$C_1$-$C_{20}$-Alkyl: straight-chain or branched hydrocarbon radicals having up to 20 carbon atoms, for example $C_1$-$C_{10}$-alkyl or $C_{11}$-$C_{20}$-alkyl, preferably $C_1$-$C_{10}$-alkyl, for example $C_1$-$C_3$-alkyl, such as methyl, ethyl, propyl, isopropyl, or $C_4$-$C_6$-alkyl, n-butyl, sec-butyl, tert-butyl, 1,1-di methylethyl, pentyl, 2-methylbutyl, 1,1-dimethylpropyl, 1,2-dimethylpropyl, 2,2-dimethylpropyl, 1-ethylpropyl, hexyl, 2-methylpentyl, 3-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 2-ethylbutyl, 1,1,2-trimethylpropyl, 1,2,2-trimethylpropyl, 1-ethyl-1-methylpropyl, 1-ethyl-2-methylpropyl, or $C_7$-$C_{10}$-alkyl, such as heptyl, octyl, 2-ethylhexyl, 2,4,4-trimethylpentyl, 1,1,3,3-tetramethylbutyl, nonyl or decyl, and isomers thereof.

$C_2$-$C_{20}$-Alkenyl: unsaturated, straight-chain or branched hydrocarbon radicals having 2 to 20 carbon atoms and a double bond in any position, for example $C_2$-$C_{10}$-alkenyl or $C_{11}$-$C_{20}$-alkenyl, preferably $C_2$-$C_{10}$-alkenyl such as $C_2$-$C_4$-alkenyl, such as ethenyl, 1-propenyl, 2-propenyl, 1-methylethenyl, 1-butenyl, 2-butenyl, 3-butenyl, 1-methyl-1-propenyl, 2-methyl-1-propenyl, 1-methyl-2-propenyl, 2-methyl-2-propenyl, or $C_5$-$C_6$-alkenyl, such as 1-pentenyl, 2-pentenyl, 3-pentenyl, 4-pentenyl, 1-methyl-1-butenyl, 2-methyl-1-butenyl, 3-methyl-1-butenyl, 1-methyl-2-butenyl, 2-methyl-2-butenyl, 3-methyl-2-butenyl, 1-methyl-3-butenyl, 2-methyl-3-butenyl, 3-methyl-3-butenyl, 1,1-dimethyl-2-propenyl, 1,2-dimethyl-1-propenyl, 1,2-dimethyl-2-propenyl, 1-ethyl-1-propenyl, 1-ethyl-2-propenyl, 1-hexenyl, 2-hexenyl, 3-hexenyl, 4-hexenyl, 5-hexenyl, 1-methyl-1-pentenyl, 2-methyl-1-pentenyl, 3-methyl-1-pentenyl, 4-methyl-1-pentenyl, 1-methyl-2-pentenyl, 2-methyl-2-pentenyl, 3-methyl-2-pentenyl, 4-methyl-2-pentenyl, 1-methyl-3-pentenyl, 2-methyl-3-pentenyl, 3-methyl-3-pentenyl, 4-methyl-3-pentenyl, 1-methyl-4-pentenyl, 2-methyl-4-pentenyl, 3-methyl-4-pentenyl, 4-methyl-4-pentenyl, 1,1-dimethyl-2-butenyl, 1,1-dimethyl-3-butenyl, 1,2-dimethyl-1-butenyl, 1,2-dimethyl-2-butenyl, 1,2-dimethyl-3-butenyl, 1,3-dimethyl-1-butenyl, 1,3-dimethyl-2-butenyl, 1,3-dimethyl-3-butenyl, 2,2-dimethyl-3-butenyl, 2,3-dimethyl-1-butenyl, 2,3-dimethyl-2-butenyl, 2,3-dimethyl-3-butenyl, 3,3-dimethyl-1-butenyl, 3,3-dimethyl-2-butenyl, 1-ethyl-1-butenyl, 1-ethyl-2-butenyl, 1-ethyl-3-butenyl, 2-ethyl-1-butenyl, 2-ethyl-2-butenyl, 2-ethyl-3-butenyl, 1,1,2-trimethyl-2-propenyl, 1-ethyl-1-methyl-2-propenyl, 1-ethyl-2-methyl-1-propenyl or 1-ethyl-2-methyl-2-propenyl, and also $C_7$-$C_{10}$-alkenyl, such as the isomers of heptenyl, octenyl, nonenyl or decenyl.

$C_2$-$C_{20}$-Alkynyl: straight-chain or branched hydrocarbon groups having 2 to 20 carbon atoms and a triple bond in any position, for example $C_2$-$C_{10}$-alkynyl or $C_{11}$-$C_{20}$-alkynyl, preferably $C_2$-$C_{10}$-alkynyl such as $C_2$-$C_4$-alkynyl, such as ethynyl, 1-propynyl, 2-propynyl, 1-butynyl, 2-butynyl, 3-butynyl, 1-methyl-2-propynyl, or $C_5$-$C_7$-alkynyl, such as 1-pentynyl, 2-pentynyl, 3-pentynyl, 4-pentynyl, 1-methyl-2-butynyl, 1-methyl-3-butynyl, 2-methyl-3-butynyl, 3-methyl-1-butynyl, 1,1-dimethyl-2-propynyl, 1-ethyl-2-propynyl, 1-hexynyl, 2-hexynyl, 3-hexynyl, 4-hexynyl, 5-hexynyl, 1-methyl-2-pentynyl, 1-methyl-3-pentynyl, 1-methyl-4-pentynyl, 2-methyl-3-pentynyl, 2-methyl-4-pentynyl, 3-methyl-1-pentynyl, 3-methyl-4-pentynyl, 4-methyl-1-pentynyl, 4-methyl-2-pentynyl, 1,1-dimethyl-2-butynyl, 1,1-dimethyl-3-butynyl, 1,2-dimethyl-3-butynyl, 2,2-dimethyl-3-butynyl, 3,3-dimethyl-1-butynyl, 1-ethyl-2-butynyl, 1-ethyl-3-butynyl, 2-ethyl-3-butynyl or 1-ethyl-1-methyl-2-propynyl, and also $C_7$-$C_{10}$-alkynyl, such as the isomers of heptynyl, octynyl, nonynyl, decynyl.

$C_3$-$C_{15}$-Cycloalkyl: monocyclic, saturated hydrocarbon groups having 3 up to 15 carbon ring members, preferably $C_3$-$C_8$-cycloalkyl such as cyclopropyl, cyclobutyl, cyclopentyl, cyclohexyl, cycloheptyl or cyclooctyl, or else a saturated or unsaturated cyclic system, for example norbornyl or norbenzyl.

Aryl: a mono- to tricyclic aromatic ring system comprising 6 to 14 carbon ring members, e.g. phenyl, naphthyl or anthracenyl, preferably a mono- to bicyclic, more preferably a monocyclic, aromatic ring system.

$C_1$-$C_{20}$-Alkoxy is a straight-chain or branched alkyl group having 1 to 20 carbon atoms (as specified above) which is attached via an oxygen atom (—O—), for example $C_1$-$C_{10}$-alkoxy or $C_{11}$-$C_{20}$-alkoxy, preferably $C_1$-$C_{10}$-alkoxy, especially preferably $C_1$-$C_3$-alkoxy, for example methoxy, ethoxy, propoxy.

Aryloxy is a mono- to tricyclic aromatic ring system (as specified above) which is attached via an oxygen atom (—O—), preferably a mono- to bicyclic, more preferably a monocyclic, aromatic ring system.

Arylalkyl is a mono- to tricyclic aromatic ring system (as specified above) which is attached via a $C_1$-$C_{20}$-alkylene group, preferably a mono- to bicyclic, more preferably a monocyclic, aromatic ring system.

Hetaryl: Heterocyclic substituents which derive formally from aryl groups by virtue of one or more methine (—C═) and/or vinylene groups (—CH═CH—) being replaced by tri- or divalent heteroatoms. The heteroatoms are preferably oxygen, nitrogen and/or sulfur, more preferably nitrogen and/or oxygen.

Heteroatoms are phosphorus, oxygen, nitrogen or sulfur, preferably oxygen, nitrogen or sulfur, any free valences of which are satisfied by hydrogen atoms.

The UV wavelength range of the electromagnetic spectrum which is of relevance for the invention is from 180 to 380 nm. Correspondingly, the visible and IR wavelength ranges of the electromagnetic spectrum are from 380 to 780 nm and 780 to 1800 nm.

According to the invention, the narrow bands have a half-height width of <(less than) 1500 $cm^{-1}$. The half-height width of a narrow band is preferably <(less than) 1200 $cm^{-1}$, more preferably <(less than) 1000 $cm^{-1}$, even more preferably from 20 to 1000 $cm^{-1}$, especially from 20 to 800 $cm^{-1}$.

The marker preferably remains bonded permanently to the article once it has been contacted with the article to be marked. For example, the marker may adhere to or be bonded to the article to be marked by chemical bonding or physical forces, for example by adsorption. A permanent bond is achieved by virtue of the marker being bonded to the article to be marked by an intense interaction. This intense interaction ensures that the marker remains bonded to the article permanently, i.e. at least for a period of a few minutes to a few years, preferably of a few days to 25 years, more preferably of one year up to 20 years, especially of one year up to 10 years.

One advantage of the process according to the invention is therefore that the markers have narrow bands not only in isolation, for example in solution, but also after contacting with the article to be marked, for example after a printing operation.

In a preferred embodiment of the process according to the invention, the marker is in contact with an article, for example a label, this article itself serving to mark a further article by being temporarily or permanently bonded to the further article, for example via an adhesive.

In a further preferred embodiment of the process according to the invention, at least one of the markers has at least two narrow bands with a half-height width of <1500 $cm^{-1}$ and these narrow bands are in the UV and/or visible and/or IR wavelength range of the electromagnetic spectrum.

Preferably, in the context of the process according to the invention, the absorption maximum of at least one narrow band is in the wavelength range from 180 to 1100 nm, more preferably in the wavelength range from 350 to 900 nm, even more preferably from 350 to 750 nm, especially from 400 to 750 nm.

In general, in the process according to the invention, markers selected from organic dyes and pigments are used, these having narrow bands in contact with the article to be marked.

In addition, however, inorganic chromophores are also possible markers, for example rare earth or transition metal compounds. Mention should be made here particularly of the ions of the rare earths with frequently very narrow-band emission lines, which are used, for example, in fluorescent lamps and in cathode ray tubes. Examples include $Y_2O_3$:Eu complexes, $Mg_4GeO_5$.5F or (Ce,Tb)$MgAl_{11}O_{19}$ (see Industrial Inorganic Pigments: edited by Gunter Buxbaum and Gerhard Pfaff, WILEY-VCH, p. 274-275, third, completely revised and extended edition). Mention should also be made of the narrow-band absorption lines of the holmium oxides $Ho_2O_3$ used for spectral calibration, and also of $Ho^{(3+)}$ in LiYF4 or Nd:YAG compounds.

The markers are preferably selected from metal-containing or metal-free phthalocyanines, preferably copper phthalocyanines, silicon phthalocyanines, aluminum phthalocyanines, zinc phthalocyanines, more preferably silicon phthalocyanines provided with sterically demanding substituents on the silicon atom or on the phthalocyanine chromophore; cyanine dyes, preferably charged cyanine dyes, more preferably rhodamine, oxazine or pseudoisocyanine dyes; merocyanines, preferably electrically neutral merocyanines, more preferably merocyanines at the cyan limit; perylene dyes; violanthrones, isoviolanthrones; squaric acid dyes; quinones, coumarins, rhodamines or porphyrins.

In preferred embodiments of the process according to the invention, the markers used are the following compounds:

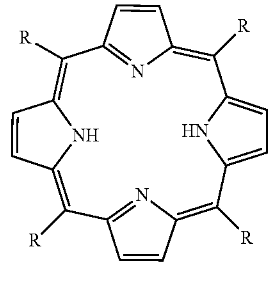

-continued
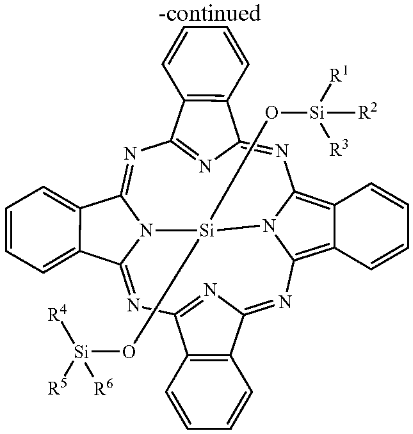
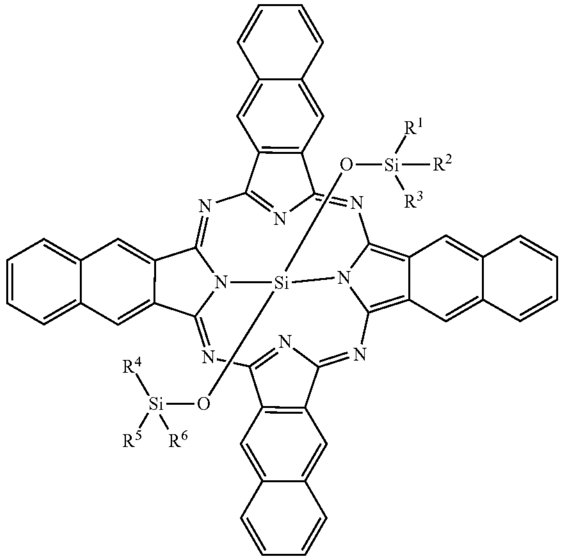
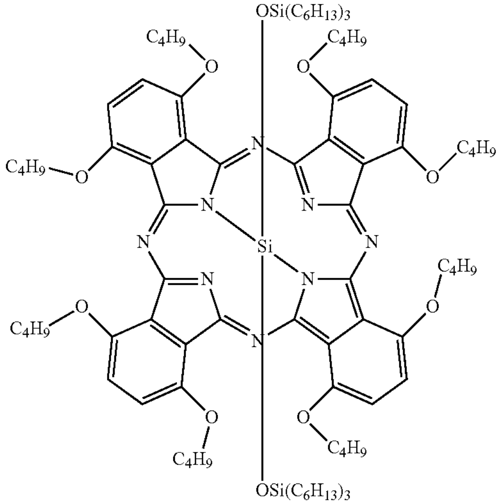
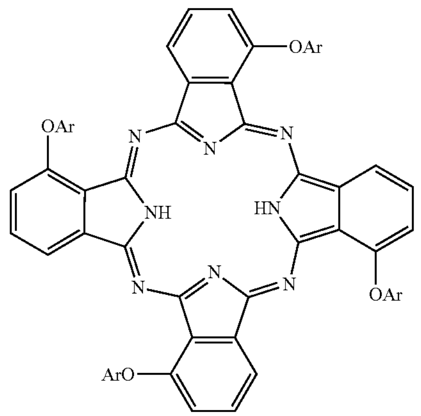
Ar = 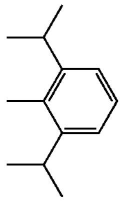
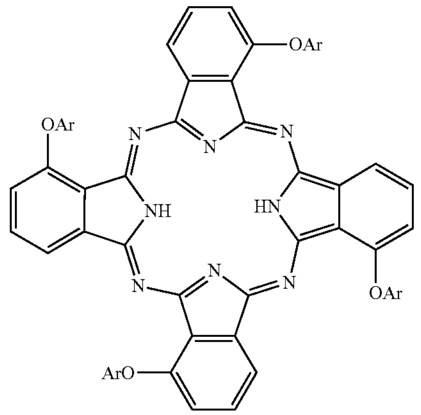
Ar = 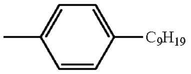
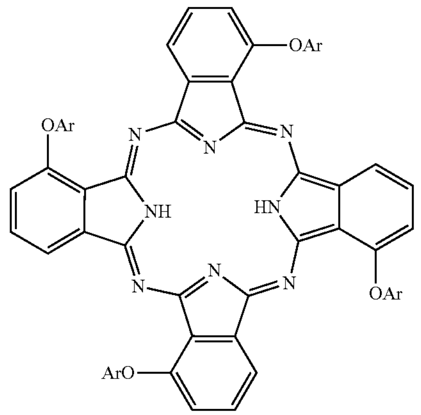
Ar = 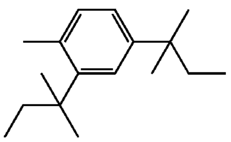
where
R is aryl, hetaryl, $C_1$-$C_{20}$-alkyl, $C_2$-$C_{20}$-alkenyl, $C_2$-$C_{20}$-alkynyl, $C_3$-$C_{15}$-cycloalkyl, $C_1$-$C_{20}$-alkoxy, aryloxy, arylalkyl,
$R^1$, $R^2$, $R^3$, $R^4$, $R^5$, $R^6$ are the same or different and are each independently, aryl, hetaryl, $C_1$-$C_{20}$-alkyl, $C_2$-$C_{20}$-alkenyl, $C_2$-$C_{20}$-alkynyl, $C_3$-$C_{15}$-cycloalkyl, $C_1$-$C_{20}$-alkoxy, aryloxy, arylalkyl, or -continued
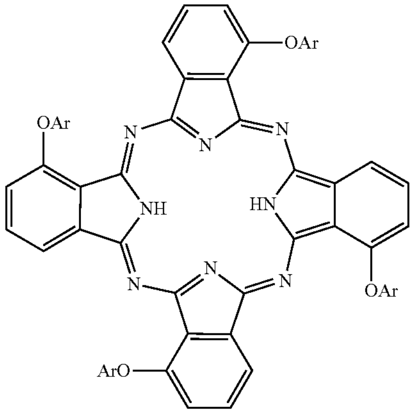
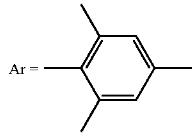
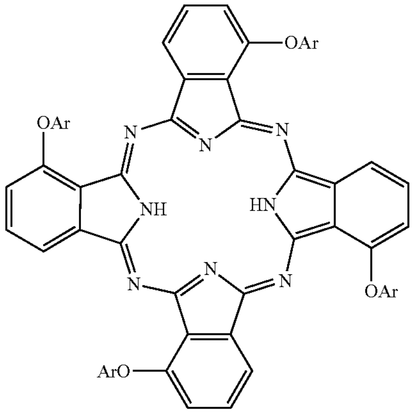
-continued
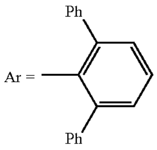
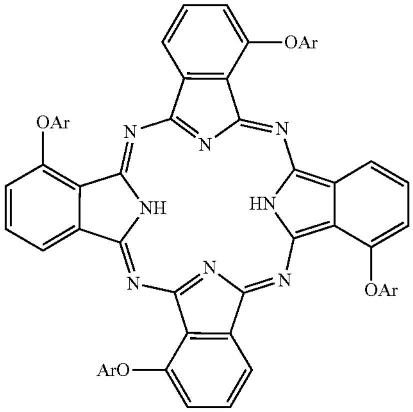
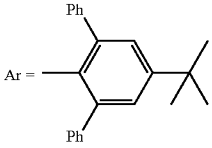
The aryl radicals may, in the general form, also comprise sulfonic acid radicals or alkali metal salts of these substituents (e.g. —$SO_3H$, —$SO_3Na$, —$SO_3K$) in the para position.
Further compounds of this kind are:
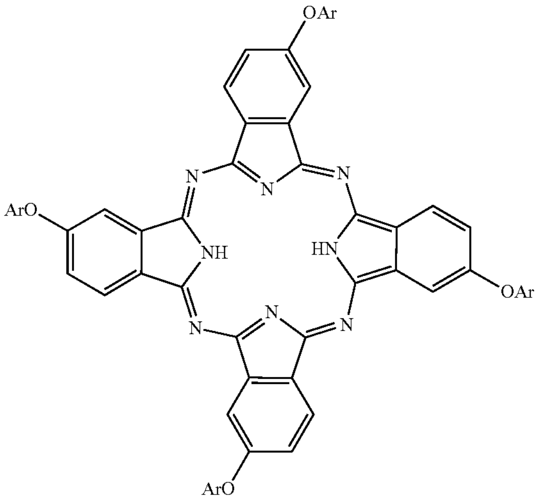
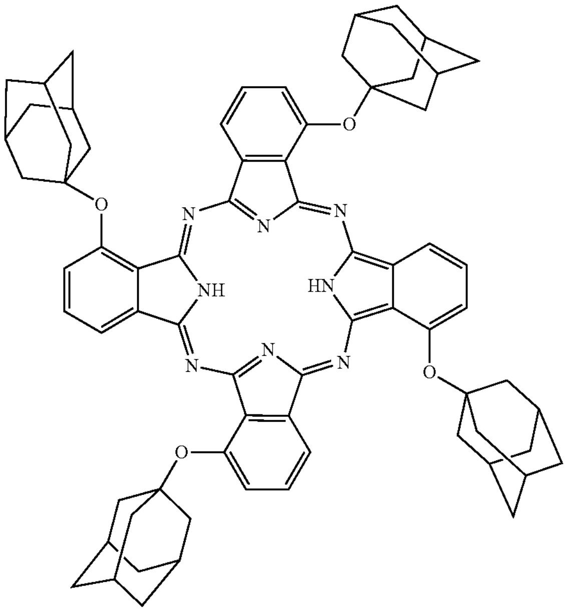

-continued
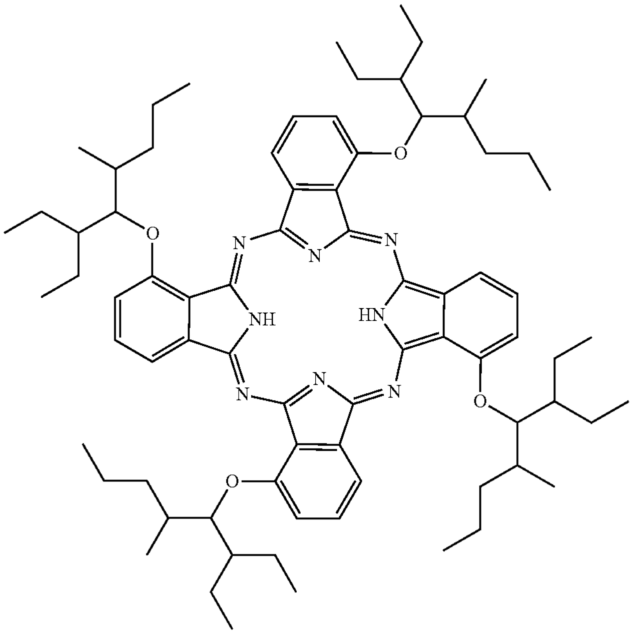
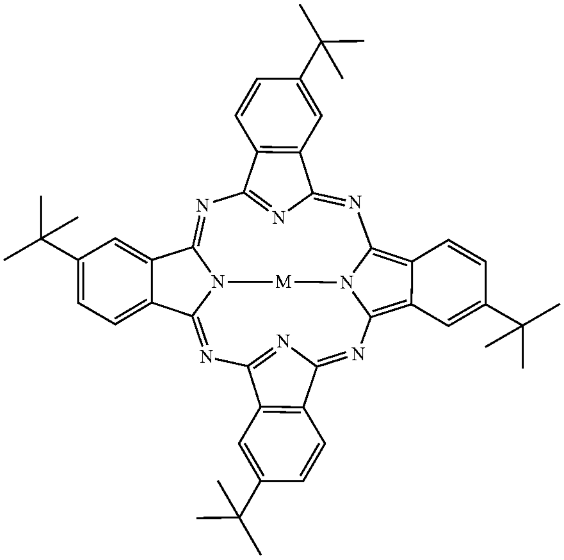
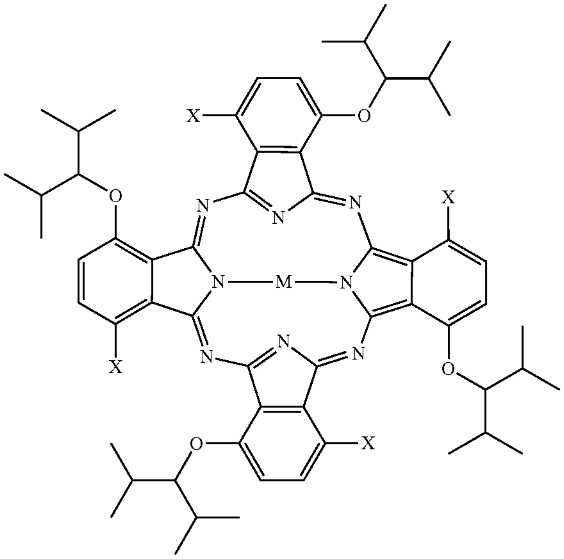
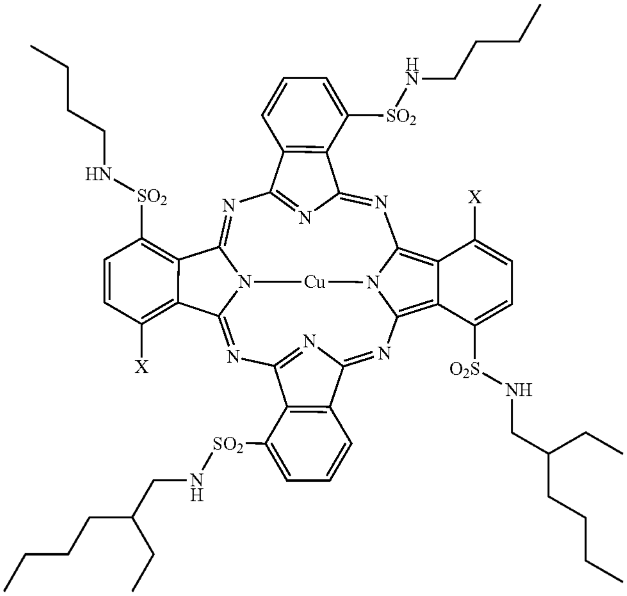

-continued
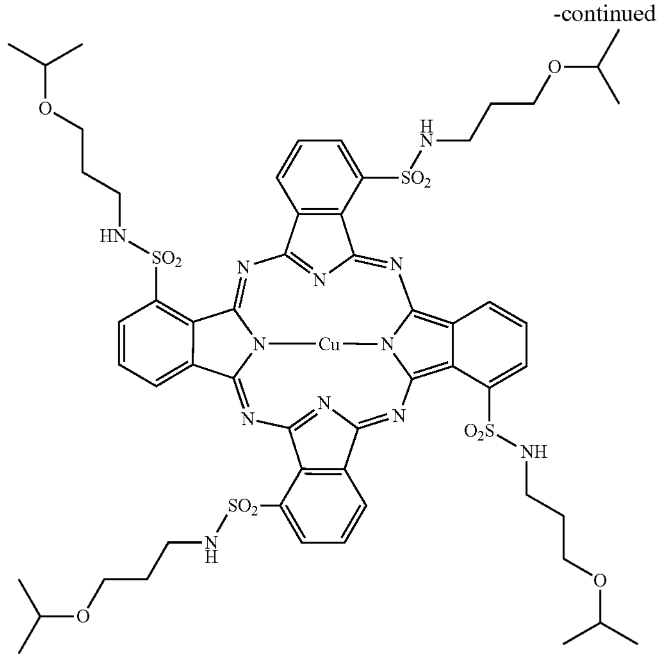
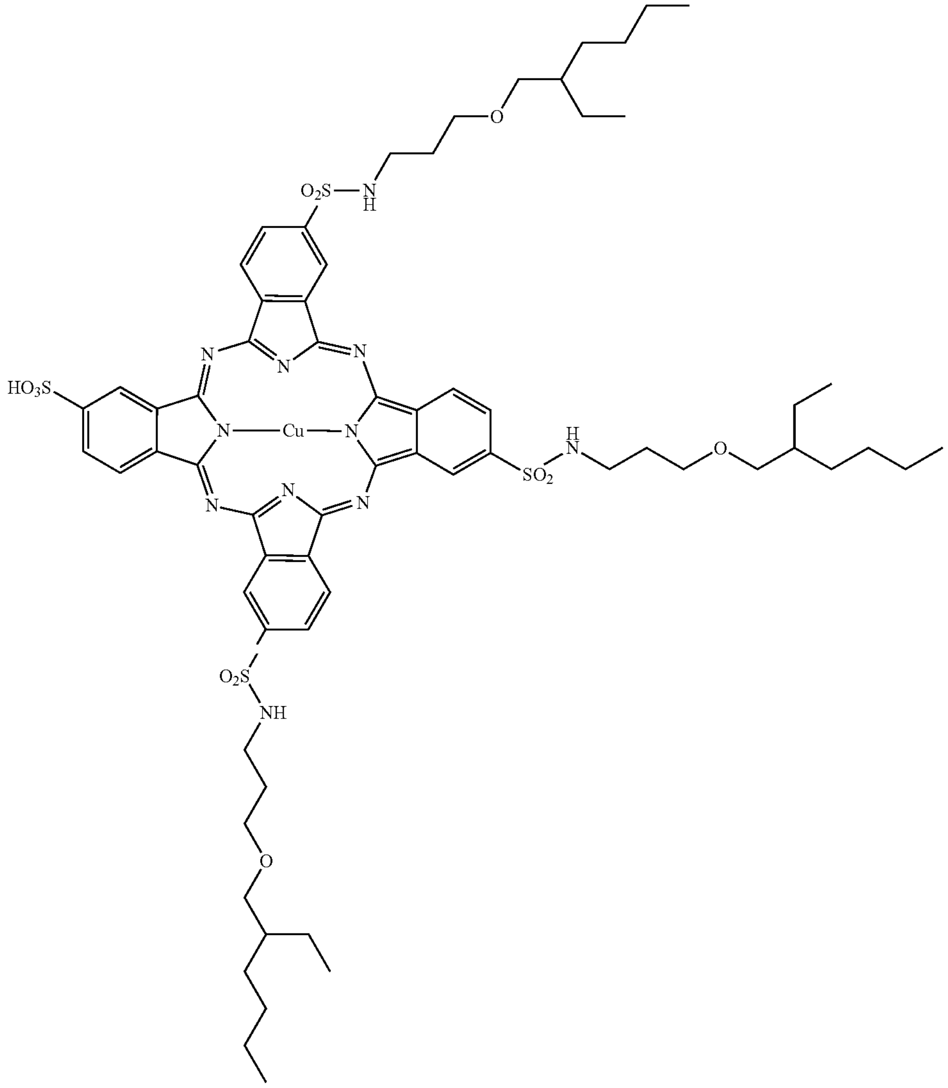

-continued

Ar =
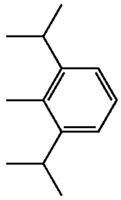

M = Cu, X = H
M = Pd, X = H, Br where

M is 2 H, Zn, AIR$^7$ $R^7$ is $C_1$-$C_{20}$-alkyl, $C_3$-$C_{15}$-cycloalkyl, aryl, hetaryl, N-heterocycle,

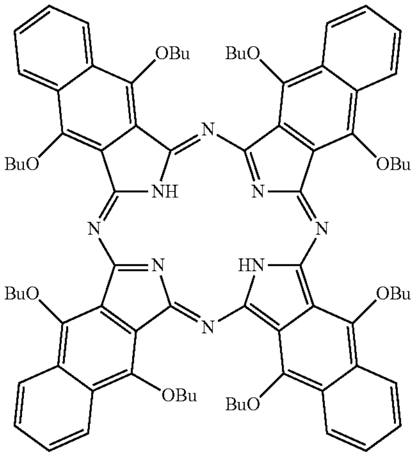

Bu: the same or different and independently n-butyl, isobutyl, preferably the same,

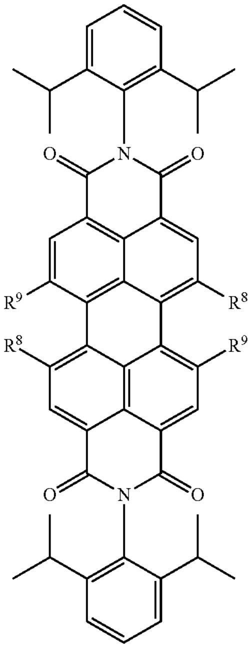

-continued

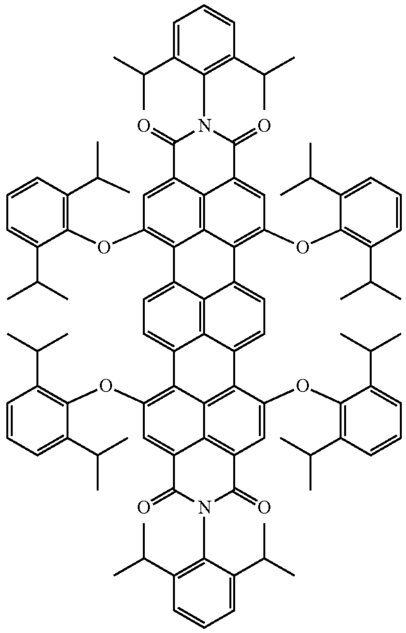

$R^8$, $R^9$ are the same or different and are each independently H, Cl, Br, CN, aryloxy, $C_1$-$C_{20}$-alkoxy, N-heterocycle N-Heterocycle here preferably pyrrolidine or piperidine. Aryloxy radicals may comprise, in the para position, sulfonic acid radicals or alkali metal salts of these substituents (—$SO_3H$, —$SO_3Na$, —$SO_3K$).

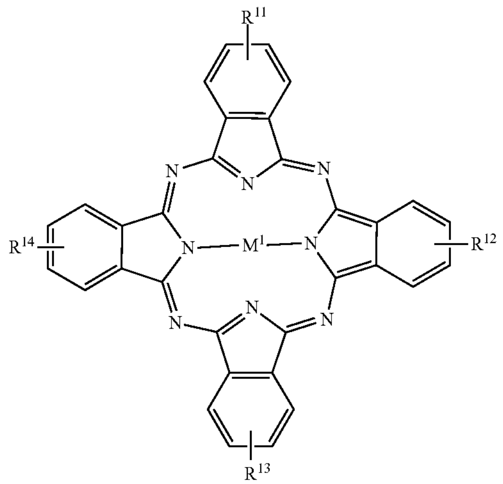
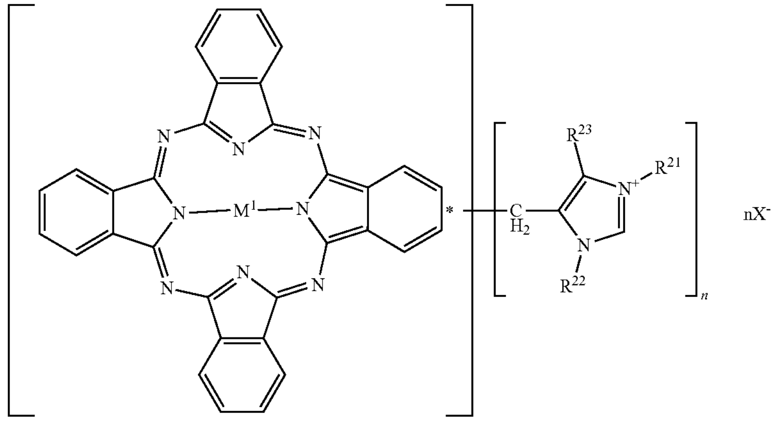
$M^1$ is 2 H, Cu, Zn,
$R^{11}$, $R^{12}$, $R^{13}$, $R^{14}$ is H, $SO_3H$, $SO_3Na$, $SO_3K$, $SO_2NH(CH_2)_3N(CH_3)_2$
$R^{21}$, $R^{22}$, $R^{23}$ is H, $C_1$-$C_{20}$-alkyl, $C_2H_{50}H$,
n is 1, 2, 3, 4
X is Cl, Br, $BF_4$, $PF_6$,
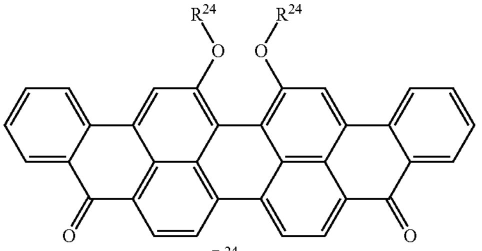
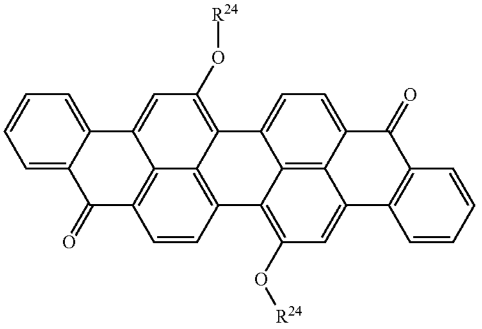
-continued
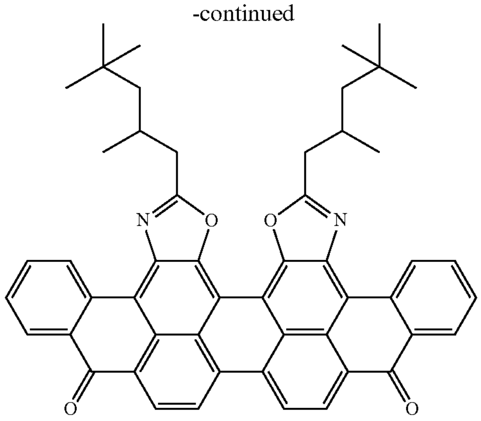
$R^{24}$ is $C_1$-$C_{20}$-alkyl, aryl,
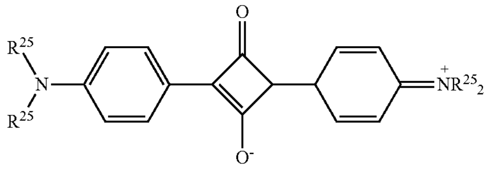

-continued

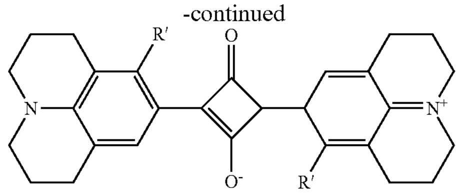

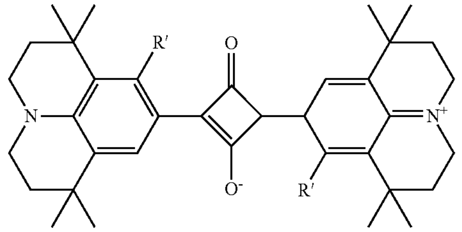

R' = H, OH $R^{25}$ is $C_1$-$C_{20}$-alkyl.

Further examples include merocyanine dyes corresponding to EP 08168116.5 (formula IIa p.34, and formula L2-03 p.37). Especially the merocyanine dye:

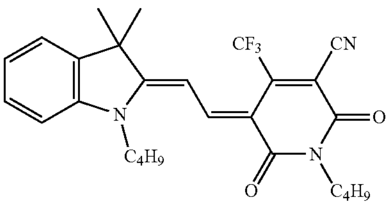

with a suitably narrow absorption band.

In general, in the process according to the invention, the marker is used in an amount which is still detectable with the aid of the respective process for later detection of the presence of the marker. This amount of marker may, for example depending on the nature of the marker or of the detection process, vary over a wide range. In general, from 50% by weight up to a few ppb, based on the total amount of marker and article to be marked, of the marker is contacted with the article to be marked, preferably from 0.01 to 10% by weight.

Preferably, in the process according to the invention, the article to be marked is contacted with at least one marker at least one site on its surface. The site to be marked on the surface is frequently relatively small in relation to the total surface area of the article. The area of the site to be marked is preferably from one square millimeter up to one square centimeter.

The article to be marked comprises, in the process according to the invention, preferably paper, for example card or cardboard, metal, glass, ceramic or plastic. More preferably, the article to be marked comprises from 1 to 99% by weight of paper, metal, glass, ceramic or plastic, even more preferably from 10 to 99% by weight. In a preferred embodiment, the article to be marked consists essentially of paper, metal, glass, ceramic and/or plastic. In a further preferred embodiment, the article to be marked is based on a composite material comprising, for example, paper or card and plastic. In a further preferred embodiment, the article to be marked is based on multilayer polymer films (laminate).

In a preferred embodiment of the process according to the invention, the article to be marked comprises paper and is a bank note, security, entrance ticket, certificate, wrapper, label or document.

In another preferred embodiment of the process according to the invention, the article to be marked comprises plastic and is a check card, film or wrapper.

In a further preferred embodiment, the article to be marked is a wrapper for consumer goods, especially medicaments, cosmetics, cleaning products, foods, or industrial goods, especially automobile parts.

Frequently, the marker is contacted with the article to be marked by print application of the marker, or of a mixture comprising the marker, onto the article. Preference is given to using, as printing processes, inkjet printing, screen printing, offset printing, flexographic printing, thermal printing, or (electro)photography. The mixtures used, comprising the marker, are, for example, printing inks or other inks. The formulation of the mixture and/or the application of the marker or of the mixture can be effected with either water-based or oil-based printing inks or other inks.

The present invention further provides a process for detecting markings on articles which have been marked in accordance with the invention, which comprises the following steps:

a. marking the article by the process according to the invention,
b. irradiating the article with electromagnetic radiation comprising a wavelength range which at least partly overlaps with the at least one narrow band of the at least one marker,
c. optionally, during step b., conducting a change in the position of the at least one narrow band by a solvatochromic, electrochromic, photochromic or thermochromic effect, and
d. determining the absorption of the article comprising a wavelength range which at least partly overlaps with the at least one narrow band of the at least one marker.

In a preferred embodiment of the process according to the invention, for detection of markings on articles (step c.), a change in the position of the at least one narrow band is undertaken during step b. by a solvatochromic, electrochromic or thermochromic effect. The change in the position of the narrow band is preferably undertaken by the action of electro- and thermochromism. A solvatochromic effect on the spectral position of the narrow band can be brought about, for example, by a change in the solvent. An electrochromic effect results from the application and the change in an electrical field, and a thermochromic effect results from the change in the temperature. A photochromic effect results from the incidence of electromagnetic radiation.

The change in the spectral position is preferably recurrent and is modulated with a particular frequency. The modulation frequency here is preferably from 0.1 to 10 Hz, especially from 0.1 to 5 Hz.

Preferably, the irradiation of the article with electromagnetic radiation (step b.) is performed with the aid of a narrow-band radiation source. The narrow-band radiation sources used are lasers such as dye lasers, solid state lasers or laser diodes. The narrow-band radiation source has, for the radiation emanating therefrom, preferably a half-height width of 0.01 to 10 nm, more preferably of 0.1 to 5 nm, especially preferably of 0.1 to 2 nm.

More preferably, the irradiation is performed with the aid of at least two radiation sources, especially narrow-band radiation sources.

In a particularly preferred embodiment of the process according to the invention for detection of markings on articles, at least one of the markers (step a.) has at least two narrow bands with a half-height width of 20 $cm^{-1}$ to 800 $cm^{-1}$ and these narrow bands are in the UV and/or visible and/or IR wavelength range of the electromagnetic spectrum, and the irradiation (step b.) is performed with the aid of at least two narrow-band radiation sources.

In a further preferred embodiment of the process according to the invention for detection of markings on articles, the determination of the absorption (step d.) is performed visually.

In a particularly preferred embodiment of the process according to the invention for detection of markings on articles, at least one of the markers (step a.) has at least two narrow bands having a half-height width of 0.5 nm to 10 nm and these narrow bands are in the UV and/or visible and/or IR wavelength range of the electromagnetic spectrum and the irradiation (step b.) is performed with the aid of at least two narrow-band light sources and the determination of the absorption (step d.) is performed visually. Preference is given to improving the visual perception by opposite phase modulation of two light sources (visual lock-in method). In this case, the intensities of the two light beams are balanced such that unmarked (regions of the) articles offer very similar or essentially the same brightnesses to the visual system. Accordingly, the observer visually observes, in marked regions, oscillation with the modulation frequency of the light sources, the modulation frequency here being preferably from 0.1 to 10 Hz, especially from 0.1 to 5 Hz.

One advantage of this process is that the human visual system in this frequency range is very sensitive to modulation. Thus, the visual lock-in method efficiently suppresses possible interference and makes the marking effect clearly evident.

In a further preferred embodiment of the process according to the invention for detecting markings on articles, the determination of the absorption (step d.) is performed by the measurement of an absorption spectrum with the aid of a spectrometer.

In a particularly preferred embodiment of the process according to the invention for detecting markings on articles, at least one of the markers (step a.) has at least two narrow bands with a half-height width of 20 $cm^{-1}$ to 800 $cm^{-1}$ and these narrow bands are in the UV and/or visible and/or IR wavelength region of the electromagnetic spectrum, and the irradiation (step b.) is performed with the aid of at least two narrow-band light sources, and the determination of the absorption (step d.) is performed by the measurement of an absorption spectrum with the aid of a spectrometer. Preference is given to improving the detection by opposite phase modulation of two light sources (electronic lock-in method). In this case, the intensities of the two light beams are balanced such that unmarked (regions of the) articles offer very similar or essentially the same intensities to the spectrometer. Accordingly, the spectrometer as the detection apparatus detects, in marked areas, oscillation with the modulation frequency of the light sources. The modulation frequency here is preferably from 0.1 to 10 Hz, especially from 0.1 to 5 Hz.

The present invention further provides a process for authenticating an article, comprising the following steps:

a. detecting the marking by the process according to the invention,
b. comparing the absorption or the absorption spectrum with a corresponding absorption or absorption spectrum of an authentic article.

Preferably, for comparison of the absorption or the absorption spectrum (step b.), parameters derived from the absorption or absorption spectrum are used. For example, these parameters are intensities or positions of absorption maxima.

Preferably, the comparison (step b.) is performed with the aid of a computer which has access to stored data for the absorption, for the absorption spectrum or parameters derived therefrom of the authentic article.

The process according to the invention can also be performed using fluorescence measurements, in which case, correspondingly, markers with narrow fluorescence signals are used. These markers are preferably selected from the group of the markers already mentioned above.

In a preferred embodiment of the process for authenticating an article, the authentication is performed with the aid of a travel ticket machine, entrance ticket machine or ATM. More preferably, the authentication is performed with the aid of a portable unit.

The process according to the invention for authenticating an article is used in the authentication of consumer goods or industrial goods, especially securities, documents, wrappers.

The present invention further provides articles which have been marked with the aid of the process according to the invention for marking articles.

Frequently, the processes according to the invention for marking can be performed for detection and for authentication with the aid of units which are known to those skilled in the art from the prior art and are thus easy to implement. The combination of narrow absorption bands, narrow-band radiation sources and the modulation of the radiation source or the band position gives an increased security standard of the inventive marking compared to known marking of articles.

The invention is illustrated in detail by the examples, though the examples do not restrict the subject matter of the invention.

EXAMPLES

Production of Printing Ink Comprising Marker

The basis used for the production of the marker printing ink was the clearcoat (matt) from Horstmann-Steinberg (ACRYLAC® Matt 57 0080/40; water-based dispersion varnish). 0.01% by weight of the marker was stirred into this varnish at room temperature (21° C.) until homogeneous distribution of the marker had been achieved.

The marker used was a mixture of silicon phthalocyanines:

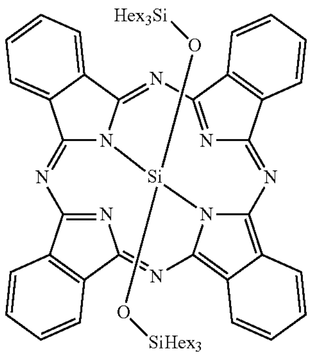

A

+

-continued

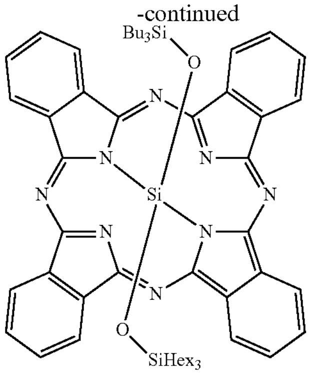

+

B

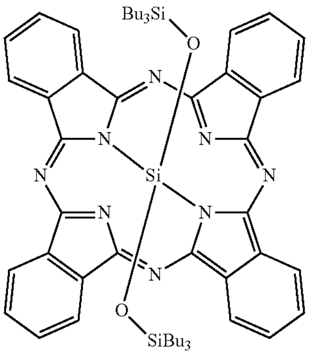

C

Bu: $C_4H_9$, Hex: $C_6H_{13}$

The compounds were used in a 1:2:1 (A:B:C) mixture. This marker exhibits a sharp absorption at 666 nm in the marker printing ink before and after the printing operation. In the solution (ethyl acetate), the mixture at 666 nm has a half-height width of 265 $cm^{-1}$ and, after the printing operation, a half-height width of 610 $cm^{-1}$.

Application of the Marking: Printing Operation

The printing operation was performed with a GTO 52 Zweifarben printing machine from Heidelberger-Druckmaschinen (offset printing).

Printing was effected both on simple typewriter paper (SM paper, DIN 6730) and on coated SM paper.

Example 1

In accordance with a selected print original (marking pattern), a marking was applied (by the printing operation) to white SM paper. The concentration of the abovementioned marker in the printing ink was reduced to such an extent that the marking, on illumination with daylight or white synthetic light, was just below the visibility limit, i.e. was not evident to the naked eye.

For further masking of the marking pattern, the marked white paper was overprinted with a color image (demonstration object). This was done with a commercial inkjet printer.

When this demonstration object was illuminated with red light, the marking pattern could be perceived by the naked eye.

The perceptibility of the marking pattern was, especially in the case of light-colored background lighting, possible but not very clear.

In order to enhance the visual effect of the perception of the marking pattern, a special illumination device was used.

This illumination device comprises two light sources with different wavelength. Two laser diodes with wavelengths of 666 nm (absorption maximum of the marker) and 650 nm (is only weakly absorbed by the marker due to the narrow absorption band) were used. This illumination device was implemented in the form of a light pen as the light source, with which the marking can be illuminated continuously for perception by the human eye.

The two abovementioned wavelengths were modulated alternately at one Hz intervals. Both wavelengths appeared to the human eye in the same color.

The intensity of the two laser beams here had been balanced such that they were of equal brightness to the human eye on white background. Therefore, the eye did not perceive the modulation on a white background.

If this light source, however, was used to illuminate the printed marking pattern, it flashed at one Hz intervals. This effect is probably attributable to the fact that there is switching back and forth between a wavelength at which the marker absorbs and a wavelength at which there is no absorption. This process can therefore be referred to as a visual lock-in method. It leads to a drastic improvement in recognition of the marking pattern. It additionally has the advantage that it steers the observer's attention to the marking pattern.

Example 2

Example 1 can be conducted analogously for the case that the detection of the marking pattern is not effected with the human eye, but rather with a spectrometer, by detecting the modulation using an absorption or fluorescence signal.

The invention claimed is:

1. A process for detecting a marking on an article, comprising:

a. marking the article, by contacting the article with at least one marker, wherein an absorption spectrum of the at least one marker has at least one narrow band with a half-height width of <1500 $cm^{-1}$ and the at least one narrow band is in at least one wavelength region of an electromagnetic spectrum selected from the group consisting of UV, visible, and IR, b. irradiating the article with electromagnetic radiation comprising a wavelength range which at least partly overlaps with the at least one narrow band of the at least one marker, c. optionally, during step b., effecting a change in a position of the at least one narrow band by a solvatochromic, electrochromic, photochromic or thermochromic effect, d. determining wavelength absorption by the article in a range comprising the wavelength range which at least partly overlaps with the at least one narrow band of the at least one marker, and e. detecting a marking on said article from said wavelength absorption, wherein the irradiation of the article with electromagnetic radiation is performed using at least two narrow-band radiation sources, switching back and forth between a wavelength at which the marker absorbs and a wavelength at which there is no absorption.

2. The process of claim 1, comprising, during step b., effecting a change in a position of the at least one narrow band by a solvatochromic, electrochromic, photochromic or thermochromic effect.

3. The process of claim 1, wherein the determination of the absorption is performed visually.

4. The process of claim 1, wherein the determination of the absorption is performed by measuring an absorption spectrum using a spectrometer.

5. The process of claim 1, wherein the at least one marker is selected from the group consisting of an organic dye, an inorganic chromophore, and a pigment.

6. The process of claim 1, wherein the at least one marker is selected from the group consisting of a metal-containing phthalocyanine, a metal-free phthalocyanine; a cyanine dye, a merocyanine, a perylene dye, a violanthrone, an isoviolanthrone, a squaric acid dye, a quinone, a coumarin, a rhodamine, a porphyrin, a rare earth compound, and a transition metal compound.

7. The process of claim 1, wherein the article is contacted with at least one marker at at least one site on a surface.

8. The process of claim 7, wherein the site has an area of one square millimeter to one square centimeter.

9. The process of claim 1, wherein the article comprises paper, metal, glass, ceramic or plastic.

10. The process of claim 9, wherein the article comprises paper and is a bank note, security, entrance ticket, certificate, wrapper, label or document.

11. The process of claim 10, wherein the article to be marked is a wrapper for consumer goods or industrial goods.

12. The process of claim 9, wherein the article comprises plastic and is a check card, film or wrapper.

13. The process of claim 1, wherein the contacting is effected by print application of the marker, or of a mixture comprising the marker, to the article.

14. A process for authenticating an article, comprising:

a. detecting the marking according to the process of claim 1, b. comparing the absorption or the absorption spectrum with a corresponding absorption or absorption spectrum of an authentic article.

15. The process of claim 14, wherein the authentication is performed using a travel ticket machine, an entrance ticket machine or an ATM.

16. The process of claim 14, wherein the article is a consumer good or an industrial good.

17. The process of claim 1, wherein the absorption spectrum of the at least one marker has at least one narrow band with a half-height width of 20 to 800 $cm^{-1}$.

18. The process of claim 1, wherein the absorption spectrum of the at least one marker has at least two narrow bands with a half-height width of $<1500$ $cm^{-1}$.

19. The process of claim 1, wherein the absorption spectrum of the at least one marker has at least two narrow bands with a half-height width of 20 to 800 $cm^{-1}$.

20. The process of claim 1, wherein an absorption maximum of at least one narrow band is in a wavelength range of 400 to 750 nm.

* * * * *